(12) United States Patent
Yoshimura et al.

(10) Patent No.: US 7,990,687 B2
(45) Date of Patent: Aug. 2, 2011

(54) GAS-INSULATED SWITCHGEAR

(75) Inventors: Manabu Yoshimura, Tokyo (JP); Takao Tsurimoto, Tokyo (JP); Osamu Kisanuki, Tokyo (JP); Yoshinori Shimizu, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 48 days.

(21) Appl. No.: 12/574,810

(22) Filed: Oct. 7, 2009

(65) Prior Publication Data

US 2010/0265635 A1 Oct. 21, 2010

(30) Foreign Application Priority Data

Apr. 20, 2009 (JP) ................................ 2009-101933

(51) Int. Cl.
*H02B 5/00* (2006.01)
*H01B 9/06* (2006.01)
*H01H 33/64* (2006.01)
*H01H 9/02* (2006.01)

(52) U.S. Cl. ......... 361/603; 174/14 R; 218/68; 218/155; 361/612

(58) Field of Classification Search .................... 218/68, 218/155; 361/603, 612, 620, 623
See application file for complete search history.

(56) References Cited

U.S. PATENT DOCUMENTS

| 3,515,939 | A | | 6/1970 | Trump | |
| 4,554,399 | A | * | 11/1985 | Cookson | 174/14 R |
| 4,730,085 | A | * | 3/1988 | Hama et al. | 174/14 R |
| 5,126,917 | A | * | 6/1992 | Matsuda | 361/603 |
| 5,654,532 | A | * | 8/1997 | Meyer et al. | 218/63 |
| 5,798,484 | A | * | 8/1998 | Yamagiwa et al. | 174/14 R |
| 6,307,172 | B1 | | 10/2001 | Bolin et al. | |
| 7,262,362 | B2 | * | 8/2007 | Holaus et al. | 174/14 R |
| 7,858,877 | B2 | * | 12/2010 | Nowakowski et al. | 174/14 R |

FOREIGN PATENT DOCUMENTS

| JP | 62-57511 U | 4/1987 |
| JP | 3-47323 Y2 | 10/1991 |

* cited by examiner

*Primary Examiner* — Gregory D Thompson
(74) *Attorney, Agent, or Firm* — Buchanan Ingersoll & Rooney PC

(57) ABSTRACT

A gas-insulated switchgear includes an electric conductor that is housed in a vessel that is sealed and filled with insulating gas, a current transformer that is housed in the vessel, which includes a coil wound around the electric conductor, an electric-field relaxing shield that is arranged in the vessel at a radially inward position relative to an inner side of the coil, and a dielectric insulating member that is arranged on an end portion of the electric-field relaxing shield.

5 Claims, 4 Drawing Sheets

PRIOR ART

GAS-INSULATED SWITCHGEAR

BACKGROUND OF THE INVENTION

1. Field of the Invention

The present invention relates to a gas-insulated switchgear that includes a sealed vessel in which components, such as a high-voltage conductor, a switch unit, and a current transformer, are housed, and insulates the components including the high-voltage conductor from the sealed vessel by filling the sealed vessel with insulating gas.

2. Description of the Related Art

A gas-insulated switchgear typically includes a cylindrical grounded tank and a cylindrical high-voltage conductor, which is coaxially arranged inside the tank, and contains sulfur hexafluoride as a main insulating medium. Because the dielectric strength of sulfur hexafluoride is approximately three times higher than that of air, use of sulfur hexafluoride as the insulating medium makes it possible to reduce a clearance between a high-voltage portion and an earthed electrode as compared with a conventional configuration, thereby configuring the switchgear compact.

However, when a foreign metallic particle enters into the tank, the foreign metallic particle can be electrically charged and radially reciprocate inside the tank, causing the withstand voltage of the equipment to decrease, so that it is necessary to remove such a foreign metallic particle or to control the motions of the foreign metallic particle. A foreign particle can enter the tank in particular through a sliding portion, because a current transformer is generally arranged near a circuit breaker and a disconnect switch.

The current transformer detects an electric current that is induced by a coil coaxially arranged with a high-voltage conductor. A conventional current transformer (see, for example, Japanese Examined Utility Model Application Publication No. H3-47323) includes a metal tube member, a high-voltage conductor that extends in the tube member, and a coil that is externally wound around the tube member. The tube member is arranged inside the sealed vessel. Because a distance between the high-voltage conductor and the tube member defines a gap distance for insulation, the sealed vessel has been required to be large in radial direction. It is necessary to reduce the gap distance to employ a smaller tank than a tank employed in the conventional current transformer; however, the strength of the electric field inside the tank increases as the electrical clearance decreases. Accordingly, increasing the insulating strength of the high-voltage conductor and the tube member, via which grounding is established, is necessary to use a smaller tank.

A disadvantage with the conventional configuration against the entry of a metal foreign material will be described. Because the strength of the electric field in a bottom of the tank other than a portion where the tube member is arranged is low, the foreign metallic particle is unlikely to be moved by the electric field. However, because the current transformer is generally arranged near the switch device, vibrations resulting from operation of the switch device can move the foreign metallic material into the tube member of the current transformer where the strength of the electric filed is higher than at the bottom of the tank. Hence, the foreign metallic particle entered the tube member can disadvantageously degrade insulating performance.

To this end, Japanese Examined Utility Model Application Publication No. H3-47323 discloses a technique for increasing the insulating strength by setting gentle curvatures for end portions of the tube member so as to reduce the strength of the electric field. This technique is based on a fact that the electric field has been likely to be dense at end portions of a tube member, and aims at suppressing electric discharge from the end portions by setting gentle curvatures for the end portions.

Japanese Laid-open Utility Model Application No. S62-57511 discloses a technique of arranging a corrugated foreign-particle trapping device on a bottom of a tank. By receiving a foreign metallic particle in a recess where the electric field is weak, the trapping device counteracts an adverse influence of the foreign metallic particle.

However, such a current transformer as disclosed in Japanese Examined Utility Model Application Publication No. H3-47323 is disadvantageous in that because the entire tube member serves as an earthing electrode, a ratio of a portion where the strength of electric field is low is small. When the ratio of the portion where the strength of the electric field is low is small, it is difficult to suppress motions of a foreign metallic particle, which can result in degradation in insulating performance.

The electric field in the current transformer is more uniform than that in a busbar. However, when a structure such as the corrugated foreign-particle trap device employed in Japanese Laid-open Utility Model Application No. S62-57511 is arranged on the inside bottom of the tube member, the strength of the electric field increases at peak portions of the corrugated shape, which can cause electric discharge from the peak portions to occur.

SUMMARY OF THE INVENTION

It is an object of the present invention to at least partially solve the problems in the conventional technology.

According to one aspect of the present invention, there is provided a gas-insulated switchgear including an electric conductor that is housed in a vessel that is sealed and filled with insulating gas; a current transformer that is housed in the vessel, which includes a coil wound around the electric conductor; an electric-field relaxing shield that is arranged in the vessel at a radially inward position relative to an inner side of the coil; and a dielectric insulating member that is arranged on an end portion of the electric-field relaxing shield.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Note that the scope of the invention is not limited to the embodiments.

Figure 1:
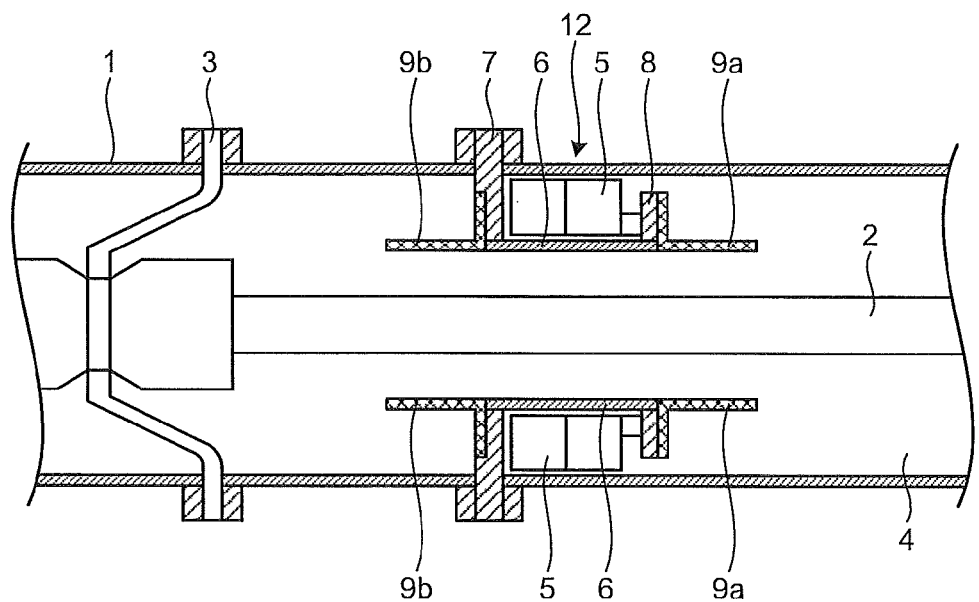
FIG. 1 is a schematic longitudinal cross-sectional view of a gas-insulated switchgear according to a first embodiment of the present invention.

FIG. 1 is a schematic longitudinal cross-sectional view of a gas-insulated switchgear according to a first embodiment of the present invention, particularly depicting a structure of a current transformer 12.

The gas-insulated switchgear includes a cylindrical grounded tank 1, a high-voltage conductor 2, the current transformer 12, and a spacer 3. The grounded tank 1 is a sealed pressure vessel that contains insulating gas. The high-voltage conductor 2 is an electric conductor that extends on a center axis of the grounded tank 1. The high-voltage conductor 2 is electrically connected with components of the gas-insulated switchgear, such as a circuit breaker (not shown) and a disconnect switch (not shown). The current transformer 12 is arranged inside the grounded tank 1. The spacer 3 supports the high-voltage conductor 2, and partitions inside the grounded tank 1 so that one gas is separated from the other gas in the grounded tank 1.

The grounded tank 1 is filled with insulating gas 4 that insulates the components, such as the circuit breaker and the disconnect switch, and the high-voltage conductor 2 from the grounded tank 1. Examples of the insulating gas 4 include sulfur hexafluoride.

The current transformer 12 includes an annular coil 5 that serves as a secondary coil (electric-current detecting coil). The current transformer 12 includes a metallic electric-field relaxing shield (hereinafter, "shield") 6 that suppresses disturbances in electric field distribution due to the shape of the coil 5. The shield is positioned radially inward in the grounded tank 1 relative to the inner surface of the coil 5. The shield 6 is, for example, a cylindrical shield that extends along the inner circumferential surface of the coil 5. The shield 6 is supported at one end portion on a support base 7 that is fixed to the grounded tank 1. A cylinder portion of the shield 6 is held in this manner. The shield 6 is pinched between the support base 7 and a coil fastener 8 that is attached to the other end portion of the shield 6.

Insulating guards 9a and 9b serving as dielectric insulating members are arranged on the end portions of the shield 6. Each of the insulating guards 9a and 9b can include, for example, a cylindrical portion. The insulating guards 9a and 9b are preferably made of insulating material. Examples of the insulating material include epoxy resins, fluorine resins, insulating rubbers, and plastic resins such as polyacetals and nylons. The inner diameter of each of the cylindrical portions of the insulating guards 9a and 9b is approximately equal in length to the inner diameter of the shield 6. The insulating guards 9a and 9b and the shield 6 are coaxially connected together.

Figure 2:
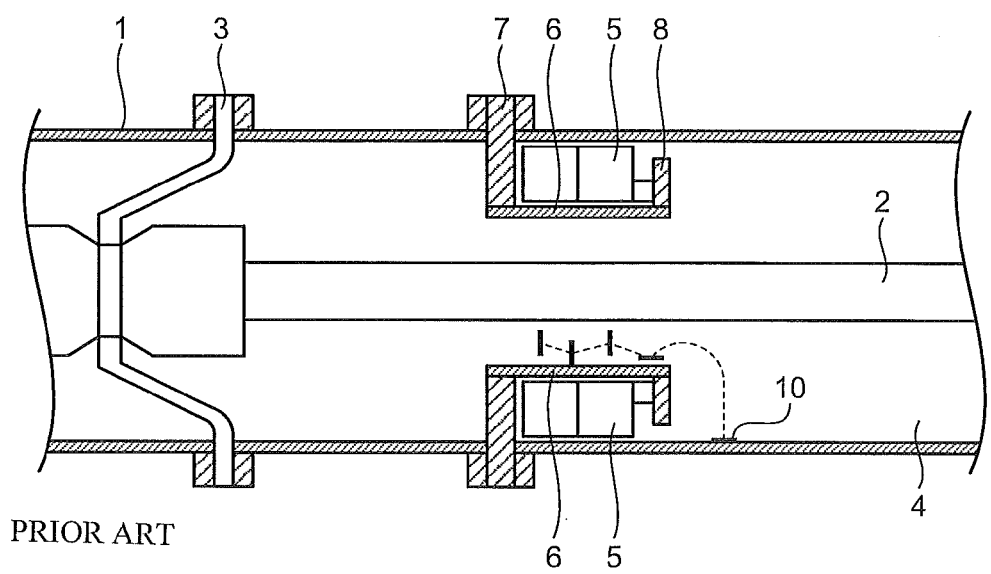
FIG. 2 is a schematic view depicting motions of a foreign metallic particle in a portion of a conventional current transformer.
Figure 3:
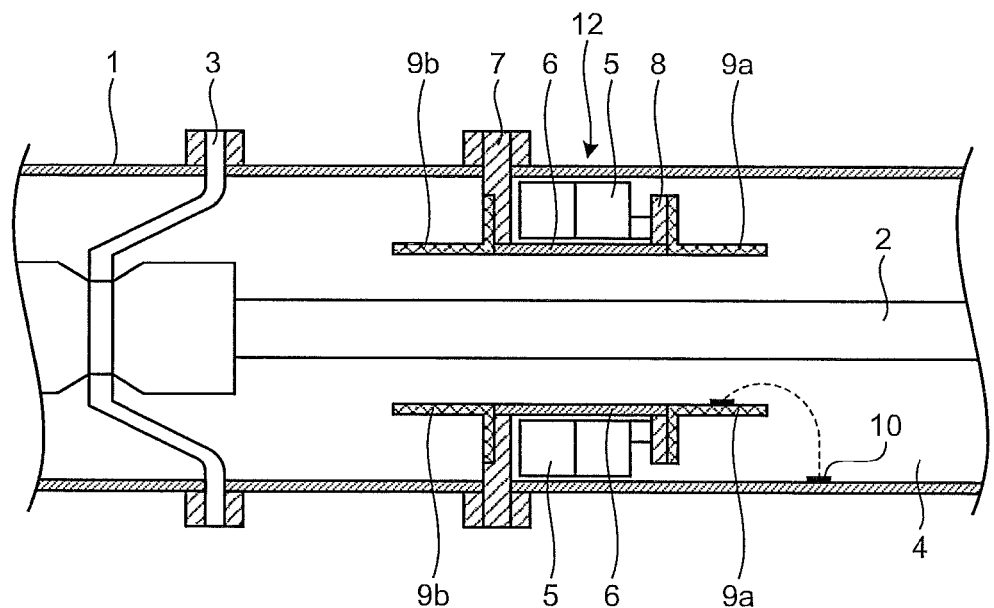
FIG. 3 is a schematic view depicting motions of a foreign metallic particle in the current transformer depicted in FIG. 1.
Figure 4:
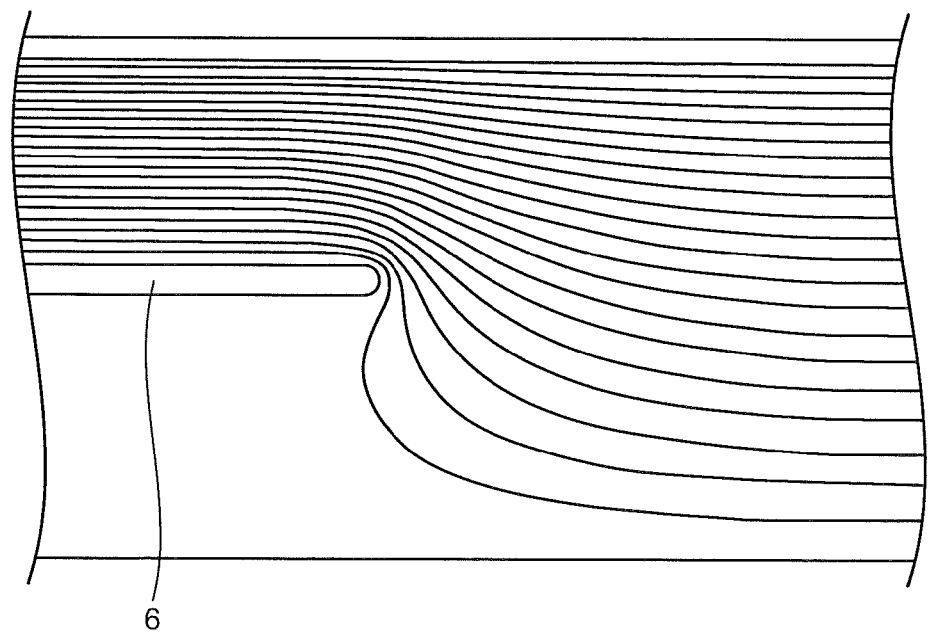
FIG. 4 is a chart illustrating electric potential distribution in a portion of the conventional current transformer depicted in FIG. 2.
Figure 5:
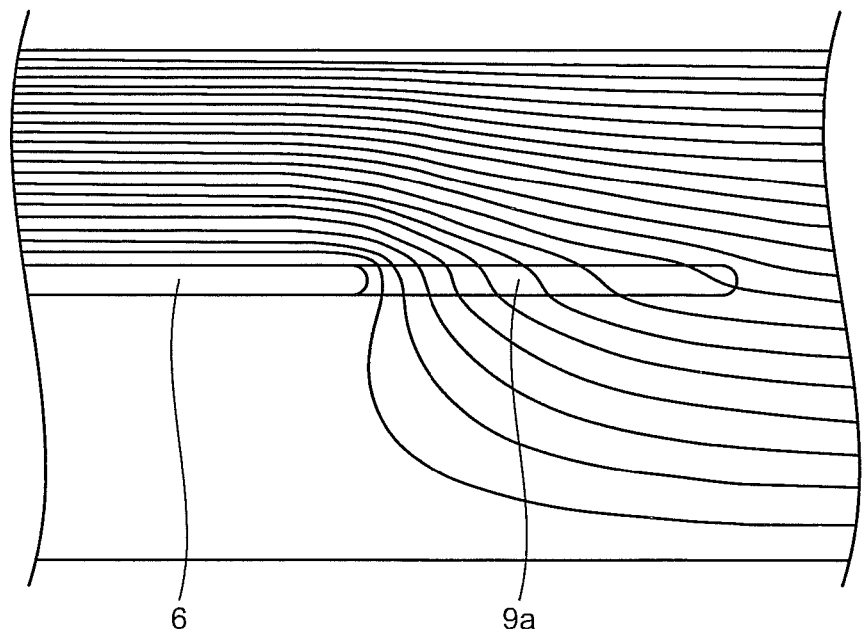
FIG. 5 is a chart illustrating electric potential distribution in a portion of the current transformer depicted in FIG. 3.

How a foreign metallic particle 10 that has entered the grounded tank 1 moves will be described with reference to FIGS. 2 to 5. FIG. 2 is a schematic view depicting motions of the foreign metallic particle 10 in a conventional current transformer. FIG. 3 is a schematic view depicting motions of the foreign metallic particle 10 in the current transformer 12 of the first embodiment. FIG. 4 is a chart illustrating electric potential distribution in a portion of the conventional current transformer depicted in FIG. 2. The chart mainly illustrates how equipotential lines near an end portion of the shield 6 are distributed. FIG. 5 is a chart illustrating electric potential distribution in a portion of the current transformer 12. FIGS. 2 and 4 are views for use in comparison with the first embodiment. The conventional current transformer depicted in FIG. 2 differs from the current transformer 12 depicted in FIG. 1 only in not including the insulating guards 9a and 9b.

Because a tank diameter of the grounded tank 1 is larger at the portion where the current transformer 12 is provided than at a busbar portion, the strength of the electric field is low at the bottom of the tank. Hence, even when the foreign metallic particle 10 is on the bottom of the grounded tank 1, the foreign metallic particle 10 is considerably unlikely moved by the electric field in the radial direction of the grounded tank 1. However, because the current transformer 12 is generally arranged near the switch device such as the circuit breaker and the disconnect switch, when the switch device is operated, the current transformer 12 can receive strong mechanical vibrations from the switch device. The vibrations can cause the foreign metallic particle 10 to levitate and move onto the grounded tank 1 as depicted in FIG. 2. In particular, in the end portion of the shield 6 where the equipotential lines are distributed densely as depicted in FIG. 4, the foreign metallic particle 10 is moved in the radial direction of the grounded tank 1 immediately after the foreign metallic particle 10 is moved onto the shield 6. This motion of the foreign metallic particle 10 can cause dielectric breakdown. Note that FIG. 4 depicts the electric potential distribution of only inside a portion of the shield 6 near the end portion of the shield 6.

In contrast, in the current transformer 12 that includes the insulating guards 9a and 9b at the end portions of the shield 6 as depicted in FIG. 1, even when mechanical vibrations cause the foreign metallic particle 10 to levitate, the foreign metallic particle 10 is likely to fall onto the insulating guards 9a and 9b. As depicted in FIG. 5, the equipotential lines near the insulating guards 9a and 9b are distributed sparsely due to dielectric effect as compared to those of FIG. 4. Accordingly, it is possible to suppress motions of the foreign metallic particle 10 near the insulating guards 9a and 9b where the strength of the electric field is relatively low. Note that FIG. 5 depicts only a portion of the shield 6 and a portion of the insulating guard 9a.

According to the first embodiment, the foreign metallic particle 10 levitated by mechanical vibrations resulting from operation of the switch device or the like is caused to fall onto the insulating guards 9a and 9b where the strength of the electric field is relatively low. Because motions of the foreign metallic particle 10 are suppressed in this manner, decrease in dielectric strength can be prevented. Hence, the gas-insulated switchgear according to the first embodiment is highly reliable in insulating performance.

Meanwhile, Japanese Laid-open Utility Model Application No. S62-57511 discloses the technique of adding the structure for trapping a foreign metallic particle on the inside bottom of the tube member of the current transformer. In contrast, because the gas-insulated switchgear according to the first embodiment includes neither an additional structure nor additional processing applied onto the interior side of the current transformer 12, electric discharge from the shield 6 is prevented without causing concentration of the electric field on the shield 6.

Figure 6:
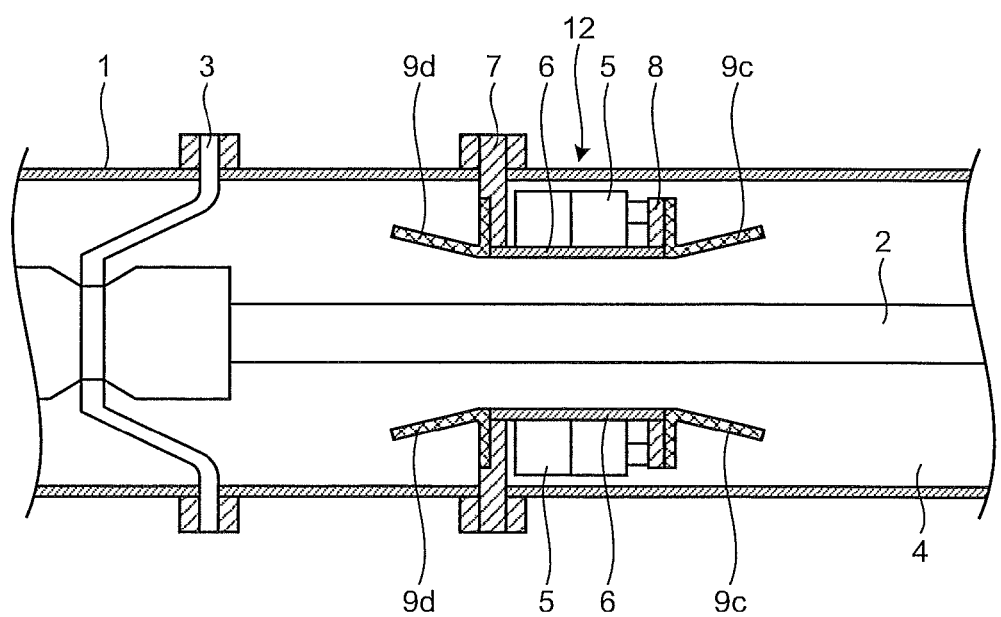
FIG. 6 is a schematic longitudinal cross-sectional view of a gas-insulated switchgear according to a second embodiment of the present invention.

FIG. 6 is a schematic longitudinal cross-sectional view of a gas-insulated switchgear according to a second embodiment of the present invention, particularly depicting a structure of the current transformer 12.

Insulating guards 9c and 9d are arranged on the end portions of the shield 6 in place of the insulating guards 9a and 9b. Each of the insulating guards 9c and 9d has a radially-expanding portion that includes a first end where the inner diameter is at the minimum and a second end. The minimum inner diameter of each of the radially-expanding portions is approximately equal in length to the inner diameter of the shield 6. One of the end portions of the shield 6 is joined to the first end of the radially-expanding portion of the insulating guard 9c while the other end portion of the shield 6 is joined to the first end of the radially-expanding portion of the insulating guard 9d such that the shield 6 and the insulating guards 9c and 9d are coaxially connected together. Put another way, the inner diameter of each of the insulating guards 9c and 9d increases as the distance from the shield 6 increases. Because the insulating guards 9c and 9d are formed in this manner, the strength of the electric field on the insulating guards 9c and 9d is still lower than that of the first embodiment. The second embodiment is similar to the first embodiment in other respects. Accordingly, in FIG. 6, the same components as those depicted in FIG. 1 are denoted by the same reference numerals, and their repeated descriptions are omitted.

According to the second embodiment, the strength of the electric field on the insulating guards 9c and 9d is still lower than that of the first embodiment. Hence, motions of the foreign metallic particle 10 can be suppressed further reliably by causing the foreign metallic particle 10 levitated by mechanical vibrations to fall onto the insulating guards 9c and 9d. Because the surface of each of the insulating guards 9c and 9d is sloped in cross section, the foreign metallic particle 10 fallen onto the insulating guard 9c or 9d slides on the surface to reach the inside bottom of the grounded tank 1 where the strength of the electric field is low. Hence, motions of the foreign metallic particle 10 can be suppressed further reliably. In this manner, dielectric breakdown that can be caused by the foreign metallic particle 10 is prevented, which leads to an increase in the withstand voltage.

Figure 7:
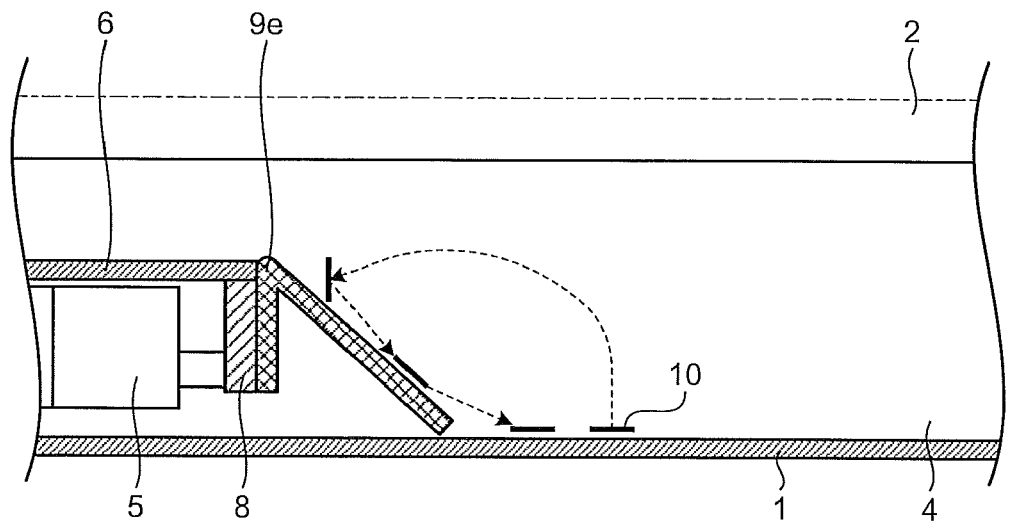
FIG. 7 is a schematic view depicting a structure of an insulating guard according to a third embodiment.

FIG. 7 is a schematic view of a structure of an insulating guard 9e according to a third embodiment of the present invention. The insulating guard 9e, which corresponds to the insulating guard 9c (FIG. 6) of the second embodiment, differs from the insulating guard 9c in that the interior surface of the insulating guard 9e is mirror finished and hence has a relatively low frictional resistance. The surface of the insulating guard 9e is inclined in cross section by 45 degrees or greater relative to the bottom surface of the grounded tank 1. Because the surface of the insulating guard 9e is mirror finished and steeply inclined in cross section, the foreign metallic particle 10 that has fallen onto the insulating guard 9e slides down the surface to reach the bottom surface of the grounded tank 1. Although not shown, another insulating guard that is similar to the insulating guard 9e and has a mirror-finished surface is arranged on the other end portion of the shield 6.

According to the third embodiment, the foreign metallic particle 10 levitated by mechanical vibrations falls onto the insulating guard 9e where the strength of the electric field is low, and slides down the surface of the insulating guard 9e to the bottom surface of the grounded tank 1 where the strength of the electric field is low. This makes it possible to prevent dielectric breakdown that can be caused by the foreign metallic particle 10, thereby increasing the withstand voltage.

Figure 8:
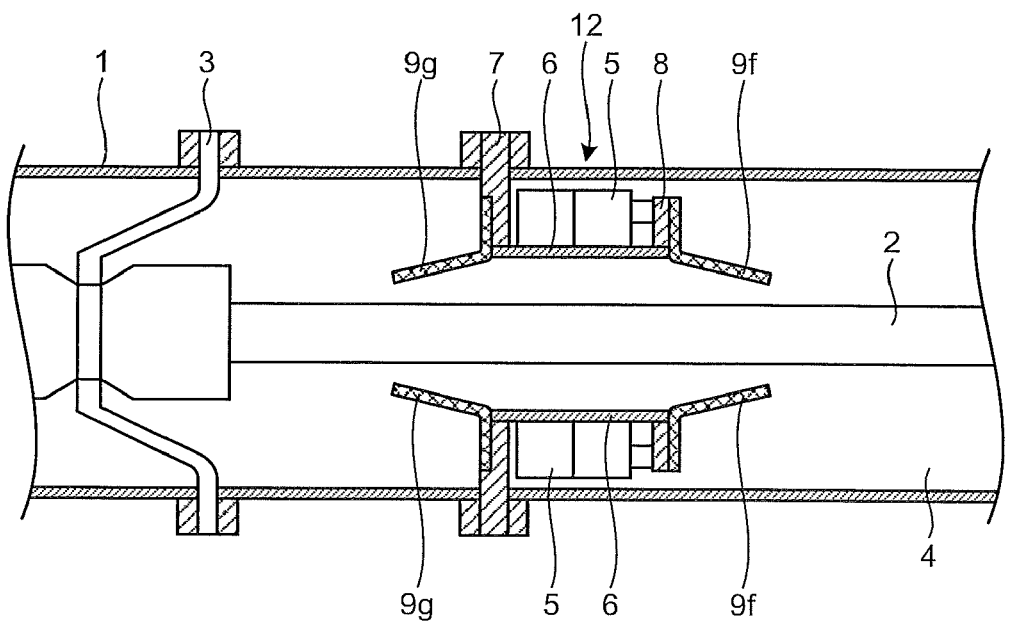
FIG. 8 is a schematic longitudinal cross-sectional view of a gas-insulated switchgear according to a fourth embodiment of the present invention.

FIG. 8 is a schematic longitudinal cross-sectional view of a gas-insulated switchgear according to a fourth embodiment of the present invention, particularly depicting a structure of the current transformer 12.

Insulating guards 9f and 9g are arranged on the end portions of the shield 6 in place of the insulating guards 9a and 9b. Each of the insulating guards 9f and 9g has a radially-narrowing portion that includes a first end where the inner diameter is at the maximum and a second end. The maximum inner diameter of each of the radially-narrowing portions of the insulating guards 9f and 9g is approximately equal in length to the inner diameter of the shield 6. One of the end portions of the shield 6 is joined to the first end of the radially-narrowing portion of the insulating guard 9f while the other end portion of the shield 6 is joined to the first end of the radially-narrowing portion of the insulating guard 9g such that the shield 6 and the insulating guards 9f and 9g are coaxially connected together. Put another way, the inner diameter of each of the insulating guards 9f and 9g decreases as the distance from the shield 6 increases.

The strength of the electric field on the insulating guards 9f and 9g according to the fourth embodiment is higher than that of the insulating guards 9a and 9b of the first embodiment. However, because the diameter of openings of the insulating guards 9f and 9g is smaller than that of the insulating guards 9a and 9b, even when the foreign metallic particle 10 is levitated by mechanical vibrations, the foreign metallic particle 10 is less likely to move onto the insulating guards 9f and 9g as compared to the first embodiment. Accordingly, the foreign metallic particle 10 unlikely enters the shield 6 where the strength of the electric field is relatively high. Hence, according to the fourth embodiment, a dielectric breakdown that can be caused by the foreign metallic particle 10 is prevented increasing the withstand voltage.

As described above, according to one aspect of the present invention, a dielectric insulating member is arranged at an end portion of an electric-field relaxing shield such that the strength of the electric field at the dielectric insulating member is lower than that at the electric-field relaxing shield. The dielectric insulating member causes a foreign metallic particle, which is levitated by mechanical vibrations resulting from operation of a switch device or the like, to fall onto the dielectric insulating member. Because motion of the foreign metallic particle is suppressed in this manner, degradation in insulating performance that can be caused by a foreign metallic particle can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A gas-insulated switchgear comprising:
   an electric conductor that is housed in a vessel that is sealed and filled with insulating gas;
   a current transformer that is housed in the vessel, the current transformer including a coil wound around the electric conductor;
   an electric-field relaxing shield that is arranged in the vessel at a radially inward position relative to an inner side of the coil; and
   a dielectric insulating member that is arranged on an end portion of the electric-field relaxing shield.

2. The gas-insulated switchgear according to claim 1, wherein
   the electric-field relaxing shield has a cylindrical shape,
   the dielectric insulating member has a cylindrical portion of which an inner diameter is equal to an inner diameter of the electric-field relaxing shield, and the dielectric insulating member and the electric-field relaxing shield are arranged such that their axes are aligned in a line.

3. The gas-insulated switchgear according to claim 1, wherein the electric-field relaxing shield has a cylindrical shape, the dielectric insulating member has a radially-expanding portion that is tapered expanding toward outside of which a minimum inner diameter is same as that of the electric-field relaxing shield, and the dielectric insulating member and the electric-field relaxing shield are arranged such that their axes are aligned in a line an end portion of the electric-field relaxing shield is joined to an end portion of the radially-expanding portion having the minimum inner diameter.

4. The gas-insulated switchgear according to claim 3, wherein an inner surface of the dielectric insulating member is a mirror-finished surface.

5. The gas-insulated switchgear according to claim 1, wherein the electric-field relaxing shield has a cylindrical shape, the dielectric insulating member has a radially-expanding portion that is tapered narrowing toward outside of which a maximum inner diameter is same as that of the electric-field relaxing shield, and the dielectric insulating member and the electric-field relaxing shield are arranged such that their axes are aligned in a line an end portion of the electric-field relaxing shield is joined to an end portion of the radially-expanding portion having the maximum inner diameter.

\* \* \* \* \*